United States Patent [19]

Columbus

[11] 4,283,134

[45] Aug. 11, 1981

[54] FILM PACK

[75] Inventor: Richard L. Columbus, Rochester, N.Y.

[73] Assignee: Eastman Kodak Company, Rochester, N.Y.

[21] Appl. No.: 143,229

[22] Filed: Apr. 24, 1980

[51] Int. Cl.³ .............................................. G03B 17/26
[52] U.S. Cl. .................................... 354/275; 354/303; 354/305; 430/497
[58] Field of Search ................. 354/88, 303, 304, 305, 354/307, 315, 317, 318, 323, 324, 331, 336, 337, 85, 275, 84; 430/208, 497

[56] References Cited

U.S. PATENT DOCUMENTS

| Re. 26,324 | 12/1967 | Land | 354/318 |
|---|---|---|---|
| 2,982,650 | 5/1961 | Land | 430/497 |
| 3,069,266 | 12/1962 | Land | 430/208 |
| 3,352,674 | 11/1967 | Harvey . | |
| 3,903,540 | 9/1975 | Hampl | 354/315 |

Primary Examiner—L. T. Hix
Assistant Examiner—Alan Mathews
Attorney, Agent, or Firm—M. S. Sales

[57] ABSTRACT

An opaque casing houses a plurality of instant photographic film units each of which has spaced apart photosensitive and cover sheets and an access hole for introduction of processing fluid into the volume between the sheets. The casing has a container of processing fluid. Fluid passage means from the container terminate at a small cross-sectional area opening positioned to align with the access holes of successively exposed film units so that processing fluid can be introduced into the film units.

8 Claims, 5 Drawing Figures

FILM PACK

CROSS REFERENCE TO RELATED APPLICATIONS

Reference is made to commonly-assigned, copending U.S. patent application Ser. No. 143,230, entitled Photographic Products Including Liquid Spreading Means, in my name, filed on even date herewith.

BACKGROUND OF THE INVENTION

The present invention relates to instant film units, also called self-processing film units, having a small port which provides access to the film unit's interior, and more specifically to packs for a plurality of such film units having both a supply of processing fluid and means for introducing the processing fluid into the film units through their ports.

BRIEF DESCRIPTION OF THE PRIOR ART

Instant film units typically include two superposed sheets and a spacer separating the sheets by a predetermined amount. One of the sheets includes a layer of photosensitive material suitable for recording a latent image that is processable by a fluid to form a visible image. The other sheet, frequently called a cover sheet, confines the fluid and facilitates its distribution over the photosensitive material. The spacer controls the depth of the distributed fluid and thereby determines the quantity of the fluid that is available to the photosensitive material for processing.

The processing fluid is usually introduced into the space between the sheets sometime after the film unit is exposed. Thus, the latent image is first created in the layer of photosensitive material and then the fluid is introduced to process the latent image and form the visible image.

Numerous approaches have been employed for storing the processing fluid prior to exposure and for distributing fluid after exposure. In most modern film units, for example, the fluid is carried in a rupturable pouch disposed at one end of the film unit. Processing of the film unit is initiated by advancing the unit between a pair of pressure rollers, progressively from one end to the other, to rupture the pouch and distribute its contents over the photosensitive material.

In another approach, illustrated in U.S. Pat. No. Re. 26324, issued on Dec. 19, 1967, the processing fluid is coated onto the photosensitive material from a reservoir located in the camera. An applicator lip draws the fluid from the reservoir by capillary forces and applies the fluid to the photosensitive material as the latter is moved relative to the applicator lip.

In an approach disclosed in U.S. Pat. No. 2,982,650, issued on May 2, 1961, capillary forces draw the processing fluid from a reservoir into the space between the photosensitive sheet and the cover sheet. The fluid enters along the full width of one end of the film unit and moves as a wave toward the opposite end of the unit.

In those film units that employ rupturable pouches, the pouch typically increases the width and thickness of at least one border of the film unit. The full-width coating approach such as shown in U.S. Pat. No. Re. 26324 is complicated by the fact that the camera isn't necessarily in the same orientation for each coating. When the camera is on its side, it is difficult to apply the fluid evenly across the full length of the applicator lip. The approach disclosed in U.S. Pat. No. 2,982,650 suffers from similar problems, and additionally requires that the entire end of the film unit be open to receive the processing fluid.

The instant film unit disclosed in my commonly assigned, copending U.S. patent application Ser. No. 143,230 entitled Photographic Products Including Liquid Spreading Means, filed concurrently herewith, includes spaced photosensitive and cover sheets. A small access port at one end of the film unit provides communication to the interior for introducing a low viscosity processing fluid from an external source into the space between the sheets. Since the fluid can be applied to the film unit at essentially a point source, the applicator is not orientation sensitive. A venting port is spaced from the access port to release the air driven from between the sheets by the progressing fluid wave front.

SUMMARY OF THE INVENTION

In accordance with the invention, an opaque casing houses a plurality of instant photographic film units each of which has spaced apart photosensitive and cover sheets and an access hole for introduction of processing fluid into the space between the sheets. The casing has a container of processing fluid. Fluid passage means from the container terminate at a small cross-sectional opening positioned to align with the access holes of successively exposed film units so that processing fluid can be introduced into the film units. Since the thickness of the processing fluid layer between the photosensitive and cover sheets should be constant across the film units, means are provided in the casing for maintaining proper and uniform spacing between the two sheets during introduction of the fluid.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENTS

Various terms such as "cartridge," "cassette," "pack," and "magazine" have been used to refer to film containers. However, the term "film pack" is most commonly used to refer to containers loaded with instant photographic film units. Because film packs and cameras for use therewith are well known, the present description is directed in particular to elements forming part of or cooperating more directly with film pack elements to which the present invention is specifically directed. Apparatus that is not shown or described is understood to be selectable from apparatus known in the art.

Figure 1:
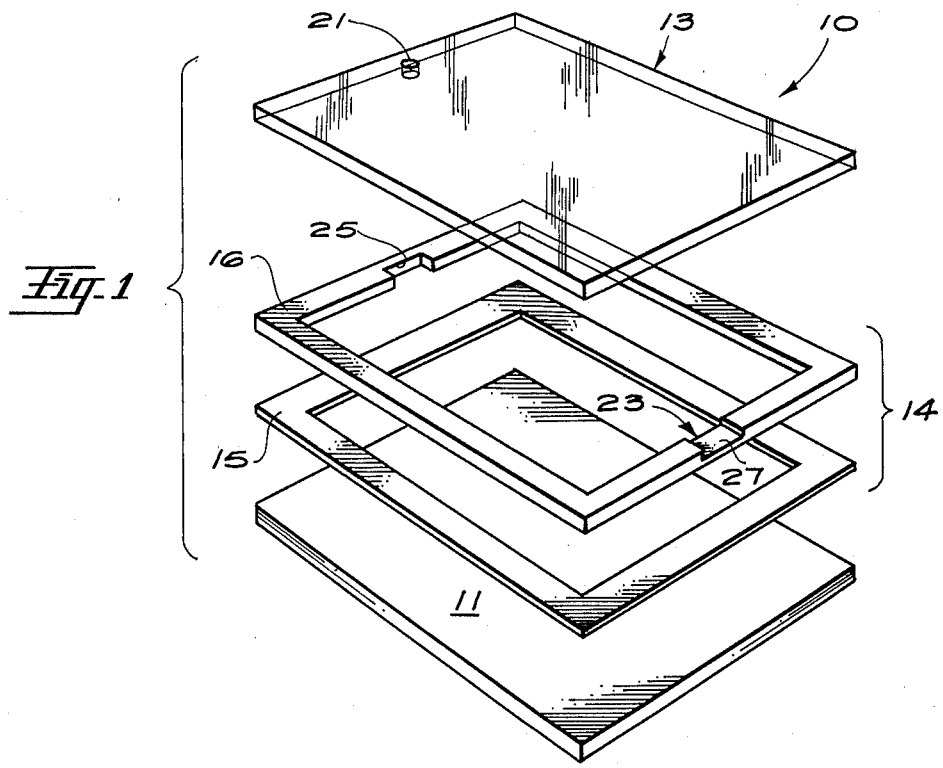
FIG. 1 is an exploded view of an instant film unit which forms a part of a film pack in accordance with the present invention.
Figure 2:
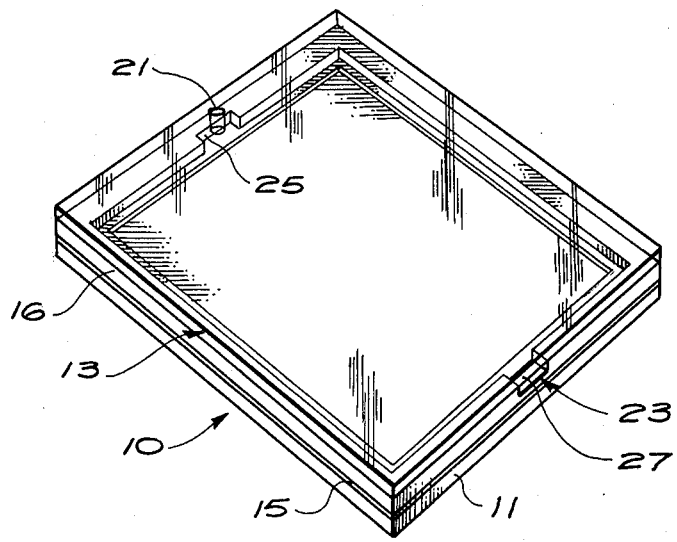
FIG. 2 is a perspective view of the film unit of FIG. 1 in its assembled condition.

Referring first to FIGS. 1 and 2, a preferred embodiment of a film unit 10 comprises a photosensitive sheet 11 and a cover sheet 13 separated by an internal spacer 14. The spacer comprises a framing element 15 and a spacing element 16. The film unit is described in detail in my aforementioned patent application filed herewith, and that description is herein incorporated by reference. Generally, however, the border region of the film unit has a small access port 21 for introducing the processing fluid from a source outside the film unit into the space between photosensitive sheet 11 and cover sheet 13. Similarly, a venting port 23 is provided opposite the access port for releasing air from between the sheets as the processing fluid is distributed therebetween. As depicted in FIG. 1, the access port extends entirely through the cover sheet into a recessed area 25 in spacing element 16. The venting port, on the other hand, extends from between the sheets. A notch 27 is cut in the spacing element 16 for this purpose.

Figure 3:
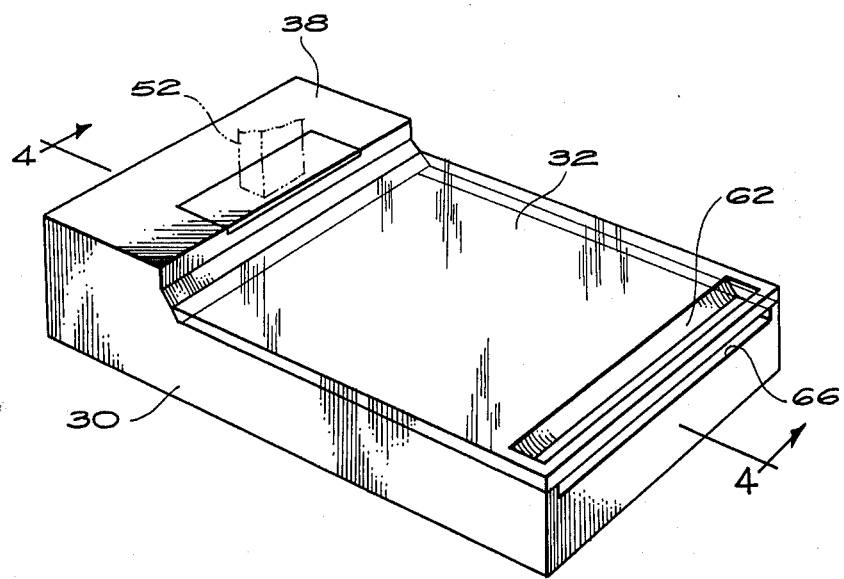
FIG. 3 is a perspective view of a film pack in accordance with the present invention.
Figure 4:
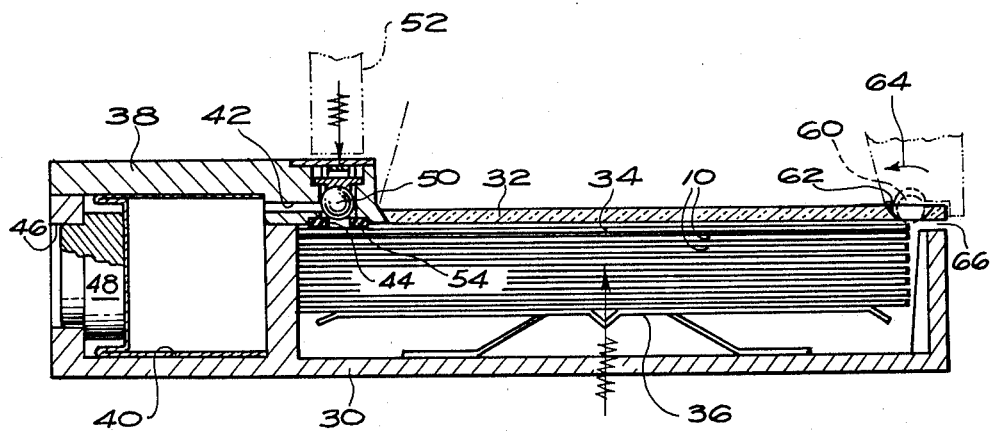
FIG. 4 is a sectional view taken along line 4—4 in FIG. 3.
Figure 5:
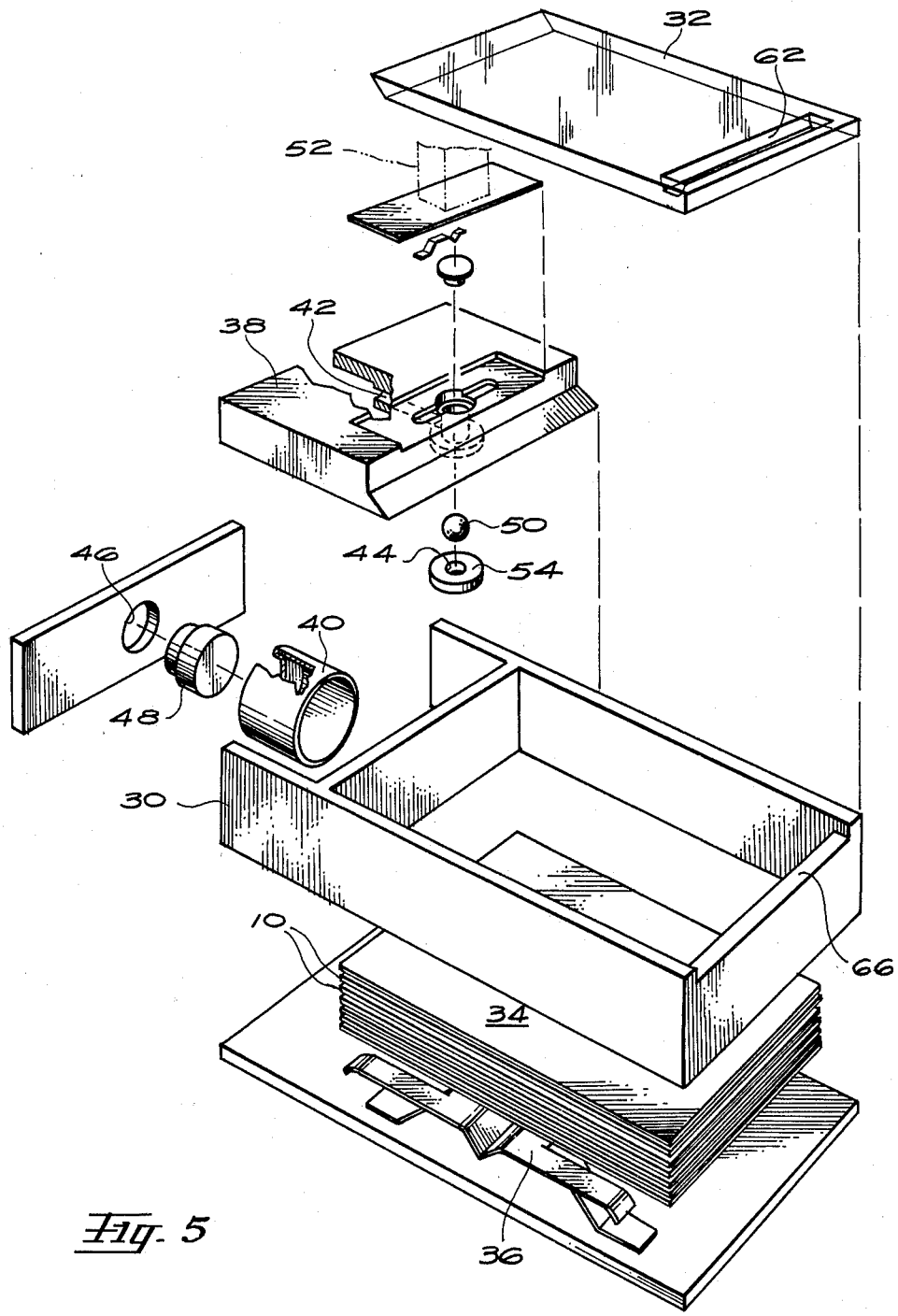
FIG. 5 is an exploded view of the film pack of FIG. 3.

FIGS. 3, 4, and 5 show a film pack according to one embodiment of the present invention. A plurality of photographic film units 10 as described above are stacked in an opaque casing 30 with their cover sheets 13 (FIG. 1) facing toward a light-transmitting panel 32. An opaque dark slide 34 underlies panel 32 to protect the top film unit from ambient light until the film pack is loaded into a camera. The film unit stack is urged toward panel 32 by a spring member 36.

Casing 30 has a processing fluid compartment 38 which houses a flexible container 40 of low viscosity processing fluid. Container 40 communicates through a passage 42 (FIG. 4) with a port 44, the latter forming a point source for admitting processing fluid to film units 10 as will be explained hereinafter. The flexible container may be compressed by a camera push rod (not shown) extending through a hole 46 in compartment 38, and pushing on a pressure pad 48 behind the container. Alternative means for applying pressure to the processing fluid, such as for example internal preloaded springs behind the pressure pad, will readily occur to those skilled in the art. The pressure may be constant or applied only when fluid is to be delivered from the container.

Flow of processing fluid through passage 42 is controlled by a valve means which in the disclosed embodiment takes the form of a spring loaded ball 50 which seats against an elastomer seal 54. Ball 50 has a steel shell with a plastic coating. To open the valve means, an electromagnet 52 is energized to unseat ball 50. Of course, the valve means may take other forms known in the art. If pressure is applied to the container only during the period when fluid is to be delivered therefrom, the force of the valve spring can be reduced to only that force needed to prevent evaporation from the container, rather than a force sufficient to seal against fluid leakage.

When the film pack is loaded into a camera, a friction roller or rollers 60 (FIG. 4) extend into a trough-like recess 62 in the front of the pack. Recess 62 is open to the interior of the film pack so that roller 60 may contact the topmost film unit, or dark slide 34 in the case of a fresh pack.

Roller 60 is selectively driven by a power source, not shown, in the camera in the direction of arrow 64. The first actuation of the roller ejects dark slide 34 from the pack through a slot 66, leaving the first film unit underlying transparent panel 32 ready for exposure. Of course the camera would also have a slot through which the dark slide is ejected.

After the first film unit is exposed, the valve means in passageway 42 is momentarily opened as previously discussed to admit processing fluid through port 44 and into access port 21 of the film unit. The processing fluid is a low viscosity solution having handling characteristics much like water which can be formed, for example, from presently available commercial processing fluids with the thickener removed. When it is introduced through the film unit access port which is essentially a point source, the low viscosity fluid spreads outwardly therefrom until it entirely fills the space between the two sheets as described in commonly-assigned, copending U.S. patent application Ser. No. 143,230, filed in the name of Richard L. Columbus on even date herewith. Such spreading can be through capillary forces and, as in the preferred embodiment, may be enhanced by introducing the fluid under slight pressure.

In addition to spreading the fluid more quickly, the pressure of the introduced fluid provides some assistance in maintaining the spacing between the sheets controlled by the spacer. That is, the fluid pressure between cover sheet 13 and photosensitive sheet 11 forces the sheets respectively against transparent panel 32 and the underlying film units 10. Of course panel 32 is rigid, while the underlying film units are supported by spring member 36. In this manner, a uniform thickness of processing fluid having a predictable dimension is maintained over photosensitive sheet 11. The processing fluid is fairly quickly absorbed into the layers of the two sheets where it can be held for some time until the fluid slowly dries by evaporation through the surfaces of the film unit.

Although the invention has been described with particular reference to a preferred embodiment thereof, it will be readily understood that variations and modifications can be effected within the spirit and scope of the invention as described hereinabove and as defined in the appended claims.

I claim:
1. A film pack comprising:
    a plurality of photographic film units, each of which (1) has means defining an interior enclosure, (2) is processable by a low viscosity fluid and (3) has a small access hole through which a supply of such fluid can be introduced into the enclosure of the film unit;
    an opaque casing housing said film units and having (1) a front wall with a light-transmitting area through which the uppermost film unit can be exposed, (2) an end wall with an elongated slot through which exposed film units can be individually advanced from the casing, and (3) a small cross-sectional area opening with which the access hole of the uppermost film unit is aligned; and
    a container of the low viscosity processing fluid in said casing having fluid passage means interconnecting said container and said opening for introducing processing fluid into each film unit after exposure.

2. A film pack as defined in claim 1 further comprising a seal around said opening engagable by the uppermost film unit to inhibit processing fluid spillage.

3. A film pack comprising:
    a plurality of photographic film units, each of which (1) has means defining an interior enclosure, (2) is processable by a low viscosity fluid and (3) has a small access hole through which a supply of such fluid can be introduced into the enclosure of the film unit;

an opaque casing housing said film units and having (1) a front wall with a light-transmitting area through which the film units can be exposed, (2) an end wall with an elongated slot through which exposed film units can be individually advanced from the casing, and (3) a small cross-sectional area opening with which the access hole of successively exposed film units can be aligned;

a container of the processing fluid in said casing having fluid passage means interconnecting said container and said opening; and valve means for controlling the flow of processing fluid into the film units.

4. A film pack as defined in claim 3 wherein said valve means is adapted to be opened magnetically.

5. A film pack comprising:

a plurality of photographic film units, each of which (1) has means defining an interior enclosure, (2) is processable by a low viscosity fluid and (3) has a small access hole through which a supply of such fluid can be introduced into the enclosure of the film unit;

an opaque casing housing said film units and having (1) a front wall with a light transmitting area through which the film units can be exposed, (2) an end wall with an elongated slot through which exposed film units can be individually advanced from the casing, and (3) a small cross-sectional area opening with which the access hole of successively exposed film units can be aligned; and a container of the processing fluid in said casing having fluid passage means interconnecting said container and said opening, said opening being spaced from the slotted end wall for introducing processing fluid into the film units at a location spaced from the leading edge advanced through the slot.

6. A film pack comprising:

a plurality of photographic film units, each of which (1) has means defining an interior enclosure, (2) is processable by a low viscosity fluid and (3) has a small access hole through which a supply of such fluid can be introduced into the enclosure of the film unit;

an opaque casing housing said film units and having (1) a front wall with a light-transmitting area through which the film units can be exposed, (2) an end wall with an elongated slot through which exposed film units can be individually advanced from the casing, and (3) a small cross-sectional area opening with which the access hole of successively exposed film units can be aligned;

a flexible container of processing fluid in said casing, said container being compressible to pressurize the processing fluid; and fluid passage means interconnecting said container and said opening for introducing processing fluid into the film units.

7. A film pack comprising:

a plurality of photographic film units, each of which (1) has means defining an interior enclosure, (2) is processable by a low viscosity fluid and (3) has a small access hole through which a supply of such fluid can be introduced into the enclosure of the film unit;

an opaque casing housing said film units and having (1) a front wall with a light-transmitting area through which the film units can be exposed, (2) an end wall with an elongated slot through which exposed film units can be individually advanced from the casing, and (3) an opening with which the access hole of successively exposed film units can be aligned;

a flexible container of processing fluid in said casing, said container being compressible to pressurize the processing fluid; and fluid passage means interconnecting said container and said opening for introducing processing fluid into the film units.

8. A film pack comprising:

a plurality of photographic film units, each of which (1) has means defining an interior enclosure, (2) is processable by a low viscosity fluid and (3) has a small access hole through which a supply of such fluid can be introduced into the enclosure of the film unit;

an opaque casing housing said film units and having (1) a front wall with a light-transmitting area through which the film units can be exposed, (2) an end wall with an elongated slot through which exposed film units can be individually advanced from the casing, and (3) a small cross-sectional area opening with which the access hole of successively exposed film units can be aligned;

a flexible container of the processing fluid in said casing, said container (1) housing a sufficient quantity of the processing fluid for processing said plurality of film units and (2) being compressible to pressurize the processing fluid; and fluid passage means interconnecting said container and said opening for introducing processing fluid into the film units.

* * * * *